(12) United States Patent
Okada

(10) Patent No.: US 7,945,096 B2
(45) Date of Patent: May 17, 2011

(54) APPARATUS FOR DISCRIMINATING THE TYPES OF RECORDING MATERIAL AND AN APPARATUS FOR FORMING IMAGE

(75) Inventor: Tomoyuki Okada, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 936 days.

(21) Appl. No.: 11/844,019

(22) Filed: Aug. 23, 2007

(65) Prior Publication Data

US 2008/0175606 A1 Jul. 24, 2008

(30) Foreign Application Priority Data

Aug. 29, 2006 (JP) ................................. 2006-232471

(51) Int. Cl.
 *G06K 9/00* (2006.01)
(52) U.S. Cl. ........ 382/181; 358/1.9; 358/3.01; 358/518; 382/254; 399/15; 399/45; 399/67
(58) Field of Classification Search ................... 358/1.9, 358/3.01, 3.3, 464, 518; 382/181, 194, 254; 399/15, 45, 67
See application file for complete search history.

(56) References Cited

U.S. PATENT DOCUMENTS

| | | | | |
|---|---|---|---|---|
| 6,121,993 | A * | 9/2000 | Maekawara et al. | 347/236 |
| 6,373,575 | B1 * | 4/2002 | Takayama et al. | 356/445 |
| 6,665,501 | B2 | 12/2003 | Okada et al. | 399/27 |
| 6,668,144 | B2 | 12/2003 | Maruyama | 399/45 |
| 6,909,798 | B1 * | 6/2005 | Yukawa et al. | 382/141 |
| 7,109,507 | B2 * | 9/2006 | Yamaguchi | 250/559.16 |
| 7,149,441 | B2 * | 12/2006 | Akita et al. | 399/45 |
| 7,518,755 | B2 * | 4/2009 | Gotoh et al. | 358/3.06 |
| 7,742,194 | B2 * | 6/2010 | Fujiwara | 358/1.9 |
| 7,791,764 | B2 * | 9/2010 | Kubota | 358/2.1 |
| 2002/0071688 | A1 | 6/2002 | Maruyama | 399/45 |
| 2007/0058211 | A1 * | 3/2007 | Kubota | 358/462 |
| 2007/0216976 | A1 * | 9/2007 | Endo et al. | 359/2 |
| 2008/0175606 | A1 * | 7/2008 | Okada | 399/15 |

FOREIGN PATENT DOCUMENTS

JP 2002-182518 6/2002

* cited by examiner

*Primary Examiner* — Gregory M Desire
(74) *Attorney, Agent, or Firm* — Fitzpatrick, Cella, Harper & Scinto

(57) ABSTRACT

The present invention provides an apparatus for discriminating the type of recording material. The apparatus comprises a component irradiating a piece of recording material with light, a sensor picking up an image of the recording material surface by receiving light reflecting off the recording material, a component converting the picked-up image into image data having a plurality of pixels arranged in a predetermined direction and a calculation component integrating the respective density difference values between a first pixel and a second pixel of the plurality of pixels. The apparatus discriminates the type of recording material based on the integrated value of the density values calculated by the calculation component. Furthermore, the present invention provides an apparatus for setting image formation requirements of an image formation component based on the integrated value of the respective density difference values between a first pixel and a second pixel of pixels.

8 Claims, 16 Drawing Sheets

APPARATUS FOR DISCRIMINATING THE TYPES OF RECORDING MATERIAL AND AN APPARATUS FOR FORMING IMAGE

BACKGROUND OF THE INVENTION

1. Field of the Invention

The present invention relates to an apparatus which discriminates the type of recording material used and an image formation apparatus for the same.

2. Description of the Related Art

Conventionally, an image formation apparatus such as copying machines or laser printers with an electrophotographic process is capable of automatically discriminating the type of recording materials used and accordingly modifying developing conditions, transfer conditions, and/or fixing conditions based on the type of the recording material that is discriminated.

There exists a method of automatically discriminating the type of recording material. The method comprises picking up images of the recording material surface by using a CCD sensor, converting the obtained surface image into fractal dimension data, evaluating the surface smoothness of the recording material, and then discriminating the type of recording material based on the surface smoothness. For example, Japanese Patent Application Laid-Open No. 2002-182518 discloses the following method. First, a surface image of the recording material is picked up by using a CCD or CMOS sensor. Since the recording material surface is uneven because of paper fibers or other elements, a tone distribution image of various light quantity, which varies according to the type of recording material, is obtained. Subsequently, the roughness of the recording material surface (surface smoothness) is obtained based on this tone distribution image, and the type of recording material is then discriminated based on the surface smoothness.

However, this method of discriminating the type of recording material based on the surface smoothness is deficient in some respects. For example, in the case where the surface smoothness for thick (i.e., heavy) paper sheets is the same as that for thinner plain paper sheets, the thick paper sheets will not be discriminated as such, and instead be mistaken for plain paper. For this reason, methods which detect the thickness of the recording material used for image forming, and then discriminate the type of recording material based on the surface smoothness and thickness thereof, have also been proposed as a means to solve this problem.

In the method used in the conventional image formation apparatus for discriminating the type of recording material based on the surface smoothness thereof, an image pickup sensor inevitably measures the light quantity unevenness due to the light source. In the conventional discrimination method, the parameter used to measure the surface smoothness of the recording material, the peak-to-peak value, which is the value of the difference between the highest and the lowest density values in the picked up image data, has been used as a parameter to discriminate the surface smoothness of the recording material. As a result, when measuring the recording material, the measured results of the surface smoothness would deviate from the true value due to light quantity unevenness. This deviation deteriorates the performance of discrimination the type of recording material. In order to circumvent this problem, the conventional art goes through the following processing steps. First, when measuring the recording material, images of the recording material are picked up multiple times while being moved. Next, the light quantity unevenness is obtained by averaging the imaging results. Namely, the process of shading is conducted based on the plurality of image data obtained from the multiple imaging to obtain the light quantity unevenness. Finally image data corresponding to the degree of the light quantity unevenness is calculated and removed from the image data picked up for final discrimination.

The conventional discrimination method will now be described in detail with reference to FIGS. 6, 8, and 9.

As shown in FIG. 6, the images 40, 41, and 42 are images of recording material surfaces, and by digitally processing these images, results like images 43, 44, and 45, for example, are obtained. When surface paper fibers are coarse, as is the case in recording material A, a large number of fiber shadows are created. Since the occurrence of these fiber shadows increases the difference between the bright and dark portions of the surface image, the peak-to-peak value becomes correspondingly large. Furthermore, for recording materials whose fibers have been substantially compressed and are thereby highly smooth, such as recording material C, the surface images thereof exhibit few fiber shadows and thus the peak-to-peak value is correspondingly small.

The peak-to-peak value derived from the Dmax and Dmin values can be calculated separately for each line (see image 43 in FIG. 6) in the digitally processed image data. In a first embodiment of the present invention, a single set of image data consists of data describing an 8×8 pixel array, and therefore peak-to-peak data for eight lines is obtained. Consequently, peak-to-peak values may be evaluated for a plurality of lines by the CMOS area sensor 801, and by averaging or integration of these values, a detection result for the whole of the imaged area of the recording material is obtained.

As described above, when the method of calculating peak-to-peak values for individual lines is employed, the light quantity from the light source might be uneven across a single line, and therefore the peak-to-peak values might be skewed as a result. FIG. 8 shows graphs illustrating this phenomenon. The graphs in FIG. 8 represent data taken from only one line of the two-dimensional output as measured by the CMOS area sensor 801. When the peak-to-peak values for plain paper and glossy paper are evaluated, although there is still a difference between these peak-to-peak values, the light quantity unevenness of the light source creates a slope (swell) in the data that is larger than the actual tone data for each pixel due to paper fibers. This slope in the data occurs as a result of the light quantity unevenness, and represents measurement errors.

Consequently, conventional methods like the above perform additional processing steps, including performing calibration processing by taking a plurality of images and then averaging each image data by each pixel in order to measure the light quantity unevenness therein. Subsequently, conventional methods perform image correction to remove the measured light quantity unevenness; in other words, shading correction has been performed. In addition, there is also an imaging method whereby instead of taking and measuring a plurality of images, the recording material is imaged during carrying, and per-pixel fiber coarseness is not measured. Shading correction will now be described with reference to FIG. 9. The uppermost graphs are schematic views of data taken from only one line of the two-dimensional output as measured by the CMOS area sensor 801. The light quantity data includes light quantity unevenness data as shown by the curves. By taking a plurality of such images and then averaging each pixel, the light quantity unevenness data (data for process of shading) that is close to the light quantity unevenness with the large slope (swell) in the graph is obtained. By subtracting this data from the actual obtained images, tone data (data corrected by shading correction) by the recording material's fiber structure, and from which the light quantity unevenness has been removed is obtained.

However, in the case where the process of shading is conducted in order to remove the effects at the sensor of the light quantity unevenness caused by the light source, the light quantity unevenness must be measured by imaging the recording material multiple times with the sensor while moving the recording material. As a result, a longer time is spent for imaging the recording material. If the time for imaging the recording material is long, the time required for discrimination of the type of recording material increases, and the start of the image forming process is delayed. Furthermore, the printing of the first page of the material to be completed is also delayed. This printing delay caused by the discrimination processing of the recording material not only delays the completion of printing the first page, it also potentially lowers the continuous printing speed. For example, in the case where the discrimination processing is conducted for each page in order to detect the type of recording material, the diminished printing speed is pronounced.

In addition, in the conventional discrimination method using peak-to-peak values, which is the value of the difference between the highest and the lowest density values in the picked-up image data, there are cases wherein the recording material cannot be sufficiently discriminated. For example, there exist some materials having a variety of surface conditions that are utilized by users as recording materials, and there are cases where discriminating these kinds of recording materials using the conventional method makes it very difficult to discriminate them as plain paper or rough paper.

SUMMARY OF THE INVENTION

An object of the present invention is to shorten the time required for processing the discrimination of types of recording materials, while maintaining the accuracy of discriminating the types of the recording material.

An apparatus of the present invention comprises a light emission component irradiating a piece of recording material with light, a sensor component having a plurality of image pickup elements, the sensor component picking up an image of the recording material surface by receiving light reflecting off the recording material with the image pickup elements, a conversion component converting the picked-up image into image data having a plurality of pixels arranged in a predetermined direction and a calculation component integrating the respective density difference values between a first pixel and a second pixel of the plurality of pixels. The apparatus discriminates the type of recording material based on the integrated value of the density values calculated by the calculation component.

An apparatus of the present invention comprises comprising an image formation component forming an image on a piece of recording material, an emission component irradiating a sheet of recording material with light, a sensor component having a plurality of image pickup elements, the sensor component picking up an image of the recording material surface by receiving light reflecting off the recording material with the image pickup elements, a conversion component converting the picked-up image into image data having a plurality of pixels arranged in a predetermined direction and a calculation component integrating the respective density difference values between a first pixel and a second pixel of the plurality of pixels. The apparatus sets requirements of the image formation component based on the integrated value of the density values calculated by the calculation component.

The present invention, without performing the process of shading conducted in the conventional method, makes it possible to discriminate recording materials while receiving little influence from light quantity unevenness. As a result, the time required to discriminate the recording material becomes shorter, and printing performance improves.

In addition, in another embodiment of the present invention, the accuracy in discriminating types of recording material can improve.

The above and other objects, effects, features, and advantages of the present invention will become more apparent from the following description of embodiments thereof taken in conjunction with the accompanying drawings.

Further features of the present invention will become apparent from the following description of exemplary embodiments (with reference to the attached drawings).

DESCRIPTION OF THE EMBODIMENTS

Hereinafter, the preferred embodiments of the present invention will be described with reference to the accompanying drawings.

The discrimination of the type of recording materials in accordance with the present invention is a discrimination method based particularly on the surface smoothness of recording material.

Figure 1:
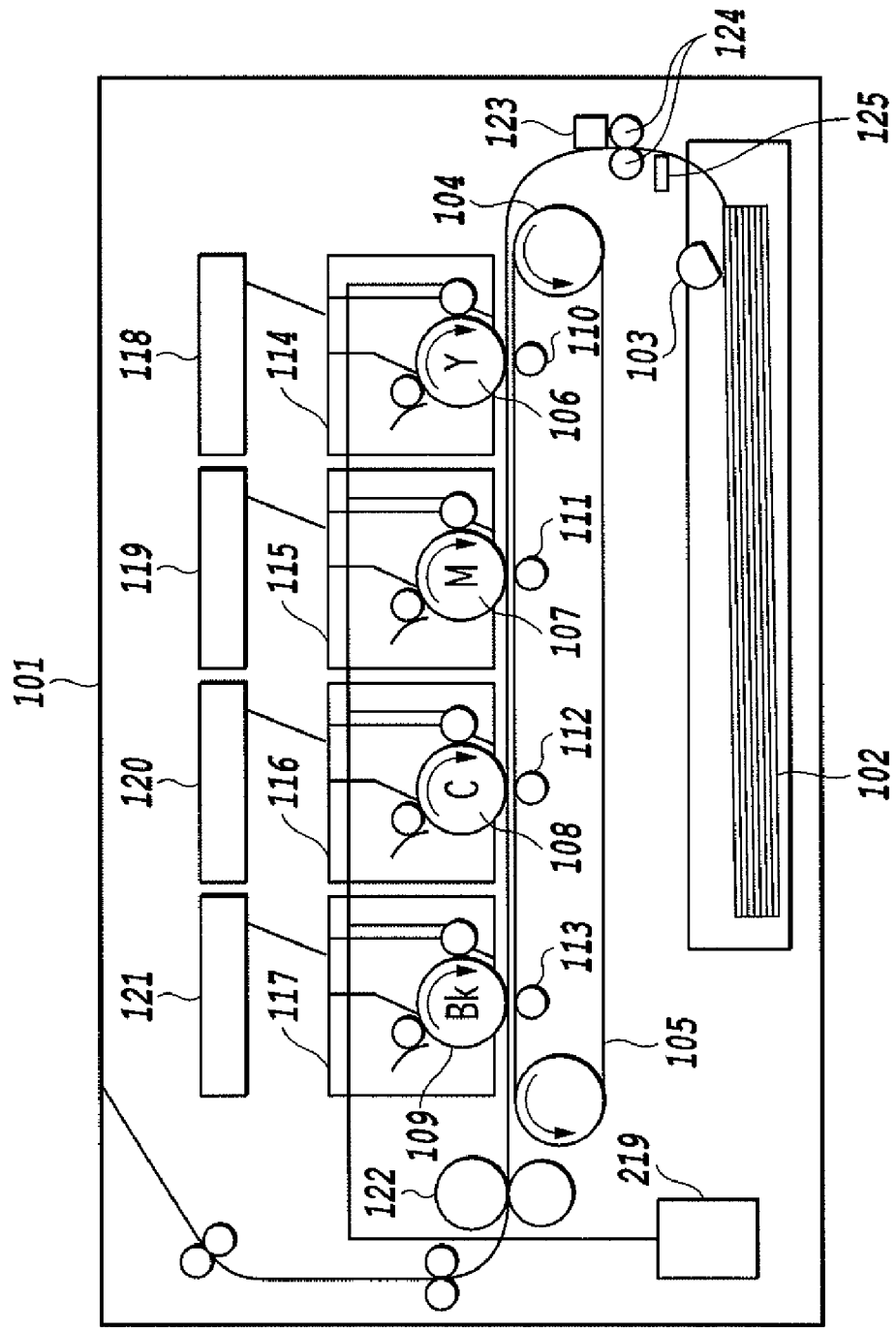
FIG. 1 is a cross-sectional view showing the structure of an image formation apparatus in accordance with the present invention.

A first embodiment of the present invention can be applied to a typical image formation apparatus as shown in FIG. 1.

The image formation apparatus 101 comprises a paper cassette 102; a paper feed roller 103; a paper carrying roller 124; a top sensor 125; transfer belt driving rollers 125; transfer rollers 110-113 for each of the toner pigments yellow, magenta, cyan, and black; and toner cartridges 114-117 for each of the toner pigments yellow, magenta, cyan, and black. In addition, the image formation apparatus 101 comprises an image forming unit which includes optical units 118-121 for each of the above-described toner pigments yellow, magenta, cyan, and black, photosensitive drums 106-109 for each toner pigment, a transfer belt 105, and a fixing unit 122 that includes a fixing roller.

The image formation apparatus 101 typically performs an electrophotographic process whereby separate toner images of yellow, magenta, cyan, and black pigments are piled up and transferred to the recording material surface, and then the fixing unit 122 controls the temperature in order to thermally fix the transferred toner images to the recording material. In addition, the optical units 118-121 for each pigment are configured to perform an exposure scan on the surface of the respective photosensitive drums 106-109 with a laser beam and form latent images. This series of image forming operations is synchronized such that images are transferred to predetermined locations upon the surface of the recording material being carried through the apparatus.

Furthermore, each of the toner cartridges 114-117 has a corresponding photosensitive drum 106-109, electrification roller 126-129, developing roller 130-133, and toner container 134-137. Before a latent image is formed on the surface of the photosensitive drum, the electric potential of the photosensitive drum surface is uniformly charged by an electrification roller. When electrification is conducted, a predetermined voltage is applied from a high voltage power supply unit 219. Subsequently, a latent image is formed by a laser beam, and the latent image formed thereby is developed through the provision of toner by a developing roller. When development is conducted, a predetermined voltage is applied through the high voltage power supply unit 219. The developed toner image is transferred to the recording material to be carried. When transfer is conducted, a predetermined voltage is applied respectively to one of the transfer rollers 110-113.

Furthermore, the image formation apparatus 101 is provided with a paper feed motor (not shown in the drawings) that feeds and carries the recording material. Recording material fed into the apparatus is carried to the transfer belt 105 and the fixing roller, whereby a desired image is formed upon the surface of the recording material.

The fed recording material is carried by the carrying roller 124 at a predetermined speed. After a predetermined time has passed since the top sensor 125 detects the tip of the recording material, operation of carrying the recording material is temporarily stopped. While the recording material is in a stopped state, an image scanning sensor 123 scans the surface image of the recording material.

The image scanning sensor 123 is disposed upstream of the image formation component comprising the transfer belt 105 and photosensitive drum 106 for the yellow toner cartridge 114, in the direction of carrying the recording material. The image scanning sensor 123 forms images by focusing reflected light irradiated on the surface of the recording material to be carried to the transfer belt 105 and then retrieving an image of a specific area of the recording material surface.

Figure 4:
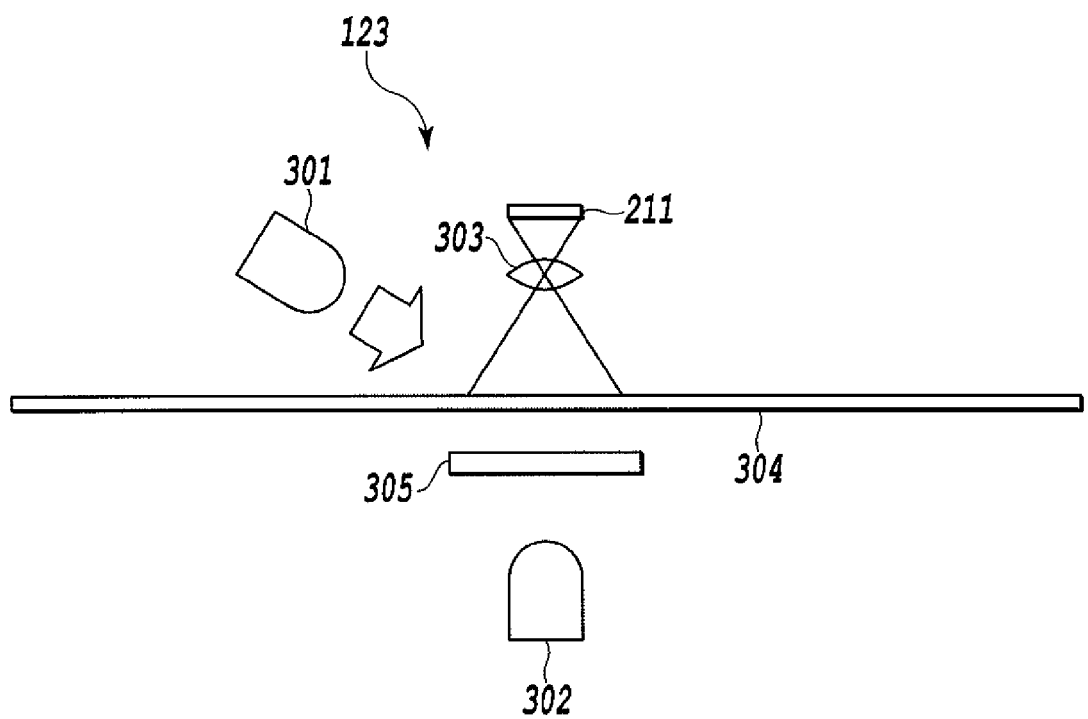
FIG. 4 shows an example of the configuration of the image scanning sensor 123 depicted in FIG. 1.

FIG. 4 shows a configuration of the image scanning sensor 123 depicted in FIG. 1. The image scanning sensor 123 comprises a light emission component that irradiates the recording material with light, and a sensor component that receives light reflecting off the recording material or light that has been transmitted through the recording material. The light emission component comprises an LED 301 for reflected light that acts as a light source, and an LED 302 for transmitted light that acts as the light source. Additionally, the sensor component which receives this light comprises a diffusion plate 305, a lens 303, and the CMOS sensor 211. The CMOS sensor 211 is a sensor having a plurality of image pickup elements. Photoelectric conversion elements are used as imaging elements. These photoelectric conversion elements are disposed so as to form a plurality of rows. Furthermore, the LED 301 is an LED for the purpose of detecting the smoothness of the recording material surface, and the LED 302 is for the purpose of detecting the thickness of the recording material.

The LED 301 irradiates with light at a predetermined angle on the front-side surface (the side upon which a toner image has been transferred) once the recording material 304 is fed and reaches the location of the sensor 123. The LED 302 irradiates with light the backside surface (the opposite of the front-side surface) of the recording material 304. The diffusion plate 305, located between the LED 302 and the lens 303, diffuses the light irradiated by the LED 302 and reduces the light quantity unevenness such that the backside surface of the recording material 304 is homogenously irradiated with light. The lens 303 focuses on the CMOS sensor 211 the light reflected off the front-side surface of the recording material 304 and the light transmitting through both the diffusion plate 305 and the recording material 304.

It should be appreciated that the image scanning sensor 123 may also be configured such that a CCD sensor is adopted instead of the CMOS sensor 211. In addition, instead of the LED 301 and the LED 302 as a light source, xenon tubes and halogen lamps or other light-emission apparatus can be used.

Figure 2:
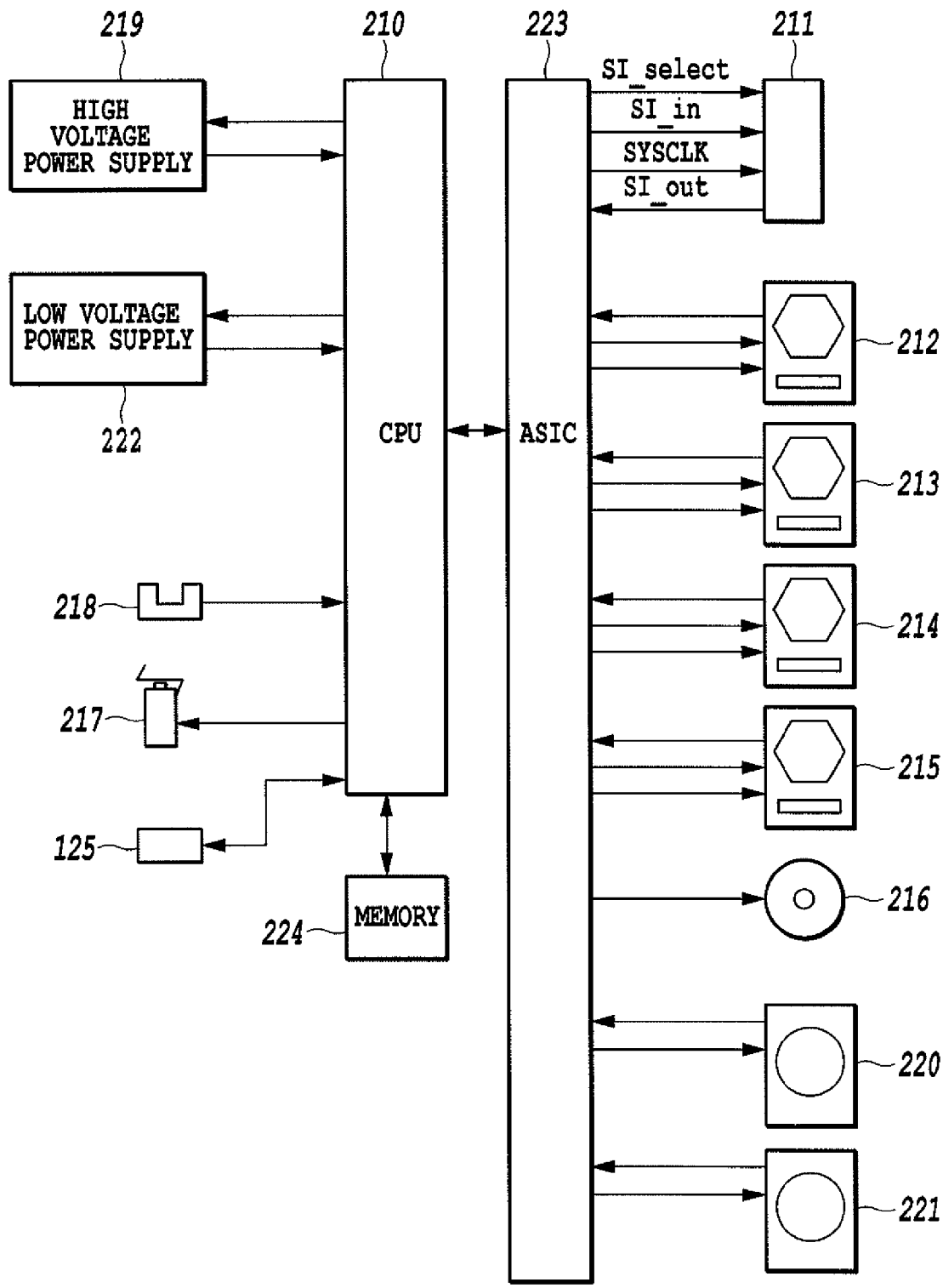
FIG. 2 schematically illustrates the basic configuration of an embodiment in accordance with the present invention.

Hereinafter, the operation of a CPU in accordance with an embodiment of the image formation apparatus according to the present invention will be described with reference to FIGS. 1 and 2. FIG. 2 shows the configuration of a CPU 210 and units that the CPU 210 controls. As shown in FIG. 2, the CPU 210 is connected to a CMOS sensor 211 and the optical units 212-215 for each color containing the respective polygon mirrors, motors, and lasers via an ASIC (application-specific integrated circuit) 223. The CPU 210 controls the per-pigment optical units 212-215 so as to scan lasers across the surfaces of their respective photosensitive drums and thereby draw the desired latent images. In addition, the CPU 210 controls a paper feed motor 216 for carrying recording material; a paper feed solenoid 217 that is used for feeding recording material when the paper feed roller 103 begins to drive; a paper presence sensor 218 for detecting whether or not the recording material is loaded at a predetermined location; the voltage (hereinafter referred to as bias) output by a high voltage power supply unit 219 for controlling the respective biases for primary electrification, development, primary transfer, and secondary transfer bias in the electrophotographic process; a drum driving motor 220 for driving the photosensitive drums 106-109 and the transfer rollers 110-113; a belt drive roller 221 for driving the transfer belt 105 and the rollers of the fixing unit 122; the fixing unit 122; and a low-voltage power supply unit 222. Furthermore, the CPU 210 monitors the temperature detected by a thermistor (not shown in the drawings) and holds the fixing temperature constant.

In addition, the CPU 210 is connected to a memory area 224 via a bus or other component. The memory 224 stores all or part of the program code and data for executing both the above-described controls and the processing conducted by the CPU 210 in each of the preferred embodiments of the present invention described in this specification. In other words, the CPU 210, by processing the program and data stored in the memory 224, controls the operation of each of the preferred embodiments of the present invention.

The ASIC 223 is a hardware circuit that, based on instructions from the CPU 210, controls the operation of the CMOS sensor 211, the speed of the motors inside the optical units 212-215, and the speed of the paper feed motor 216. The motor speed control is conducted by detecting a tachometer signal from a motor (not shown in the drawings) and then sending an acceleration or deceleration signal to the motor such that the tachometer signal interval will be a predetermined amount of time. For speed control of a plurality of motors, hardware control by the ASIC 223, for example, instead of software control has the merit of reducing the control load on the CPU 210.

The CPU 210, upon receiving print commands from a host computer (not shown in the drawings), determines the presence or absence of recording material using the paper presence sensor 218. In the case where recording material is present, the CPU 210 controls the driving of the paper feed motor 216, the drum driving motor 220, the belt driving motor 221, and the paper feed solenoid 217 such that recording material is carried to a predetermined location.

When the top sensor 125 detects the tip of the recording material and the recording material is carried to the location where the sensor 123 is installed after a predetermined amount of time has passed since the detection, the CPU 210 issues image pickup instructions to the ASIC 223. Upon receiving these instructions, the ASIC 223 picks up a surface image of the recording material using the CMOS sensor 221. The ASIC 223, after setting Sl_select to active, outputs a predetermined pulse of SYSCLK (system clock) values at a predetermined timing, and subsequently picked-up image data output by the CMOS 211 via a Sl_out signal.

On the other hand, when the CPU 210 sets a predetermined value in the internal register of the ASIC 223, the ASIC 223 sets Sl_select to active, outputs a predetermined pulse of SYSCLK values at a predetermined timing, and configures the gain settings of the CMOS sensor 211 via an Sl_in signal.

The ASIC 223 is provided with an internal control circuit to be hereinafter described. The results of the calculations performed to discriminate the recording material type are stored in the internal register of this control circuit. Additionally, the CPU 210 reads this stored calculation result, discriminates the type of the stored recording material, and subsequently controls the reconfiguration of the image formation requirement according to the discrimination result.

The following is given as examples of the variety of image formation requirement whose control is executed by the CPU 210. For example, in the case where the surface fibers of the recording material are coarse, i.e., rough paper, the CPU 210 lowers the voltage of the developing roller during development to less than that of plain paper, and prevents toner scattering by reducing the amount of toner adhered to the surface of the recording material. This adjustment is performed to eliminate degradation of image quality caused by toner scattering due to paper fibers when the amount of toner adhered to the surface of the recording material is large, particularly when rough paper is used.

In addition, the CPU 210, after discriminating the type of the fed recording material, may variably control the temperature conditions of the fixing unit 22 according to the discrimination result. If the recording material is glossy paper, the voltage during development is the same as that of the plain paper case, but the fixing temperature in the fixing apparatus is configured to be higher than that of plain paper. This configuration is necessary to further improve the fixation of the toner image, since the surface fibers of glossy paper are high density compared to plain paper.

Furthermore, the CPU 210 may variably control the carrying speed, in particular the carrying speed in the fixing apparatus, of the recording material according to the results of the recording material type discrimination. For example, when the recording material is glossy paper, fixation can be improved by lowering the carrying speed to less than the carrying speed of plain paper. The CPU 210 controls this carrying speed by configuring the speed control value in the register of the ASIC 223, which controls speed.

Voltage during development, fixing temperature, and carrying speed have been described in the foregoing as examples, but these voltage during development, fixing temperature, carrying speed, and other parameters, and the voltage during transfer, may also be accordingly modified according to the recording material type.

In this way, in the foregoing embodiment in accordance with the present invention, the ASIC 223 performs calculations in order to discriminate the type of recording material being used based on the surface image of the recording material picked up by the CMOS sensor 211. The result of these calculations is stored in the internal register of the ASIC 223. Subsequently, the CPU 210 reads this calculation result stored in the internal register of the ASIC 223 and discriminates the recording material type. According to that discriminated recording material type, the CPU 210 then controls the changing of conditions such as the voltage of the high voltage power supplied during development, the fixing temperature of the fixing apparatus, and the carrying speed of the recording material.

It should be appreciated that the changing of the voltage during development, the fixing temperature of the fixing unit, the carrying speed of the recording material, and other conditions may also be conducted according to the calculated result. In this case, the discrimination processing step wherein the recording material type may be omitted.

Figure 3:
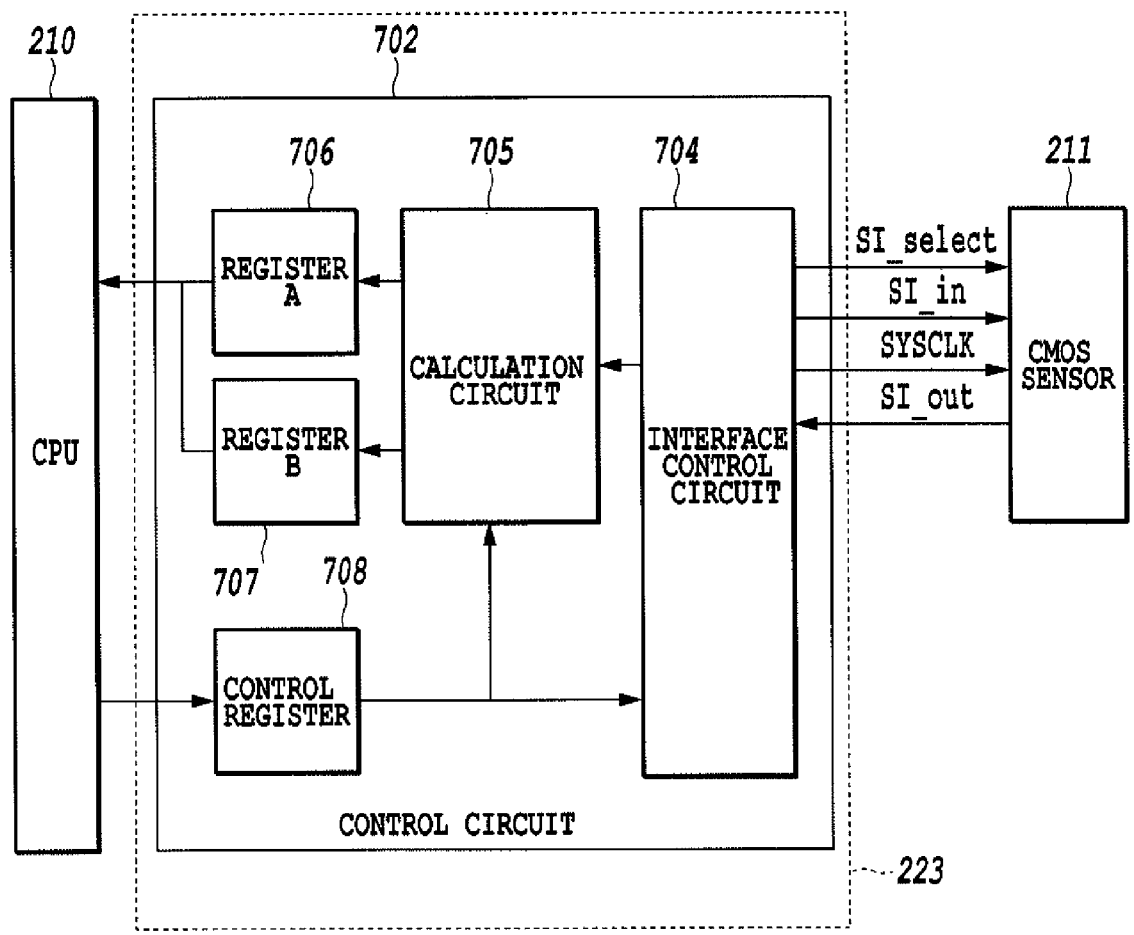
FIG. 3 is a block diagram showing the configuration of the control circuit 702.

FIG. 3 shows the configuration of a control circuit 702 inside the ASIC 223 shown in FIG. 1.

The control circuit 702 is provided with an interface control circuit 704, a calculation circuit 705, a register A 706, a register B 707, and a control register 708. When the CPU 210 passes on to the control register 708 operating instructions for the CMOS sensor 211, electrical charge is accumulated in the CMOS sensor 211. Subsequently, the interface control circuit 704 selects the CMOS sensor 211 by outputting an Sl_select signal. Additionally, the interface control circuit 704 outputs SYSCLK (system clock) values generated at a predetermined timing to the CMOS sensor 211. The CMOS sensor 211 then synchronizes its picked-up digital image data with the SYSCLK values and outputs the image data as an Sl_out signal to the interface control circuit 704.

The control circuit 702, based on the digital image data, calculates the amount of asperity and the amount of asperity edges on the recording material surface. The control circuit 702 then stores the value for the amount of asperity in the register A 706, and stores the value for the amount of asperity edges in the register B 707.

Figure 5:
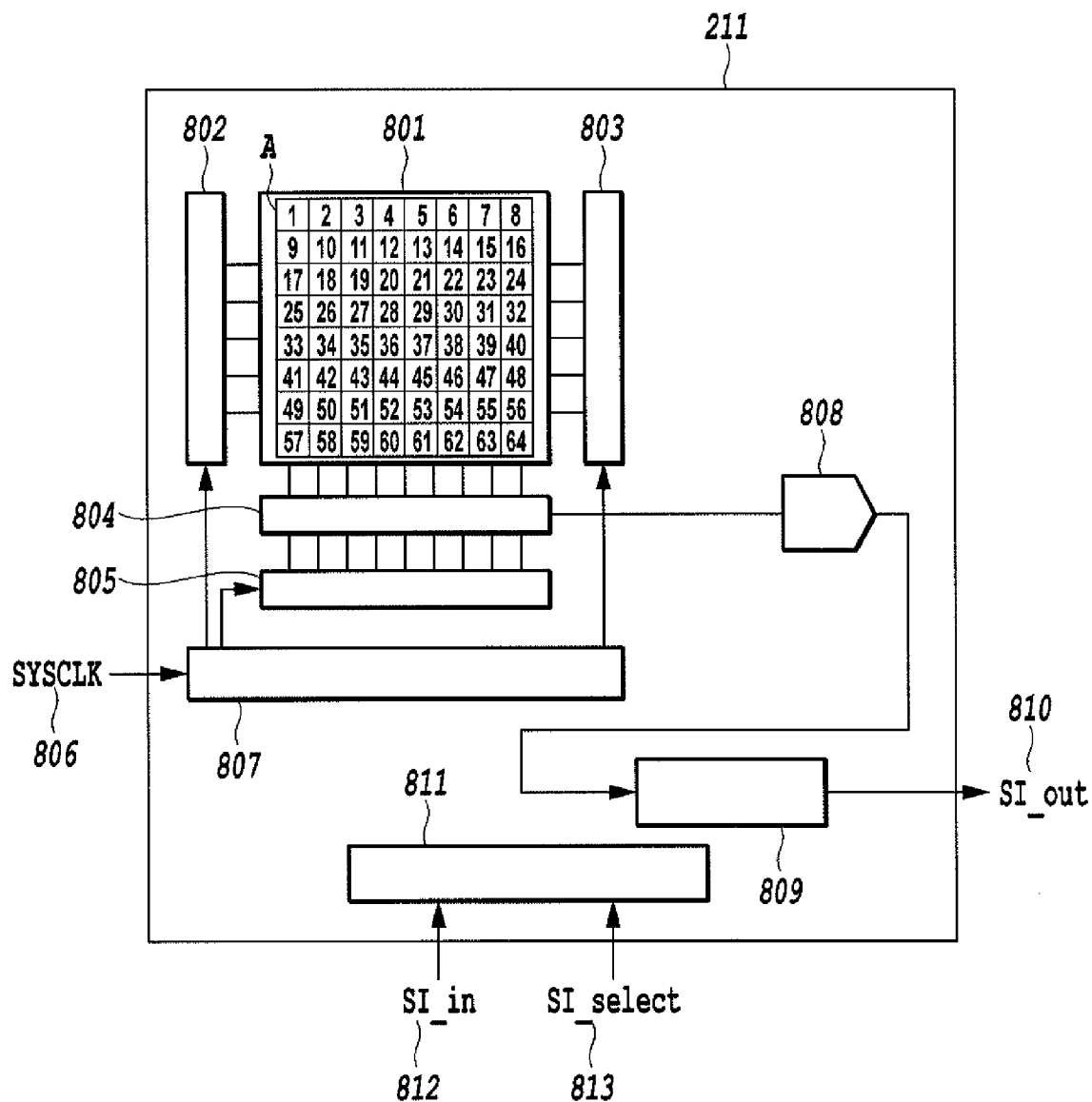
FIG. 5 is a block diagram showing the configuration of the CMOS sensor 211 depicted in FIG. 1.

FIG. 5 shows the configuration of the CMOS sensor 211 shown in FIG. 2.

When the Sl_select signal 813, a select signal, becomes active, received light is converted by photoelectric conversion and accumulated as charge by the CMOS area sensor 801, which is capable of picking up images of a plurality of pixels. In the present embodiment, a CMOS area sensor having 8×8=64 pixels of photoelectric conversion elements is implemented. As shown in FIG. 5, the CMOS area sensor has 8×8=64 units of photoelectric conversion elements A (1-64).

Subsequently, a line of pixels is read from vertical shift registers 802 and 803, synchronized with the system clock SYSCLK pulse 806 via a timing generator 807, and selected in sequence. This read pixel data is then sequentially stored in an output buffer 804. The data in the output buffer 804 is forwarded to an A/D converter 808 via a horizontal shift register 805 and thereby converted into digital pixel data. Namely, the picked-up image data is, by the vertical shift registers 802 and 803, and the horizontal shift register 805, converted into two-dimensional image data consisting of a plurality of pixels arranged in predetermined directions. While the Sl_select signal 813 is active, this digital pixel data is output from an output interface circuit 809 at a predetermined timing as an output signal, the Sl_out signal 810.

Additionally, in order to obtain optimal image contrast, when changing requests are received from the CPU 210 to adjust A/D conversion gain, the control circuit 702 inside the ASIC 223 activates the Sl_select signal 813. Subsequently, the control circuit 702 outputs a system clock SYSCLK pulse 806 at a predetermined timing to the CMOS sensor 211. In addition, the control circuit 702 outputs an Sl_in signal 812 to the CMOS sensor 211. The control circuit 811 inside the CMOS sensor 211, receiving the Sl_in signal 812 as input, adjusts A/D conversion gain performed by the A/D converter 808.

(Discrimination Recording Material Type)

Figure 6:
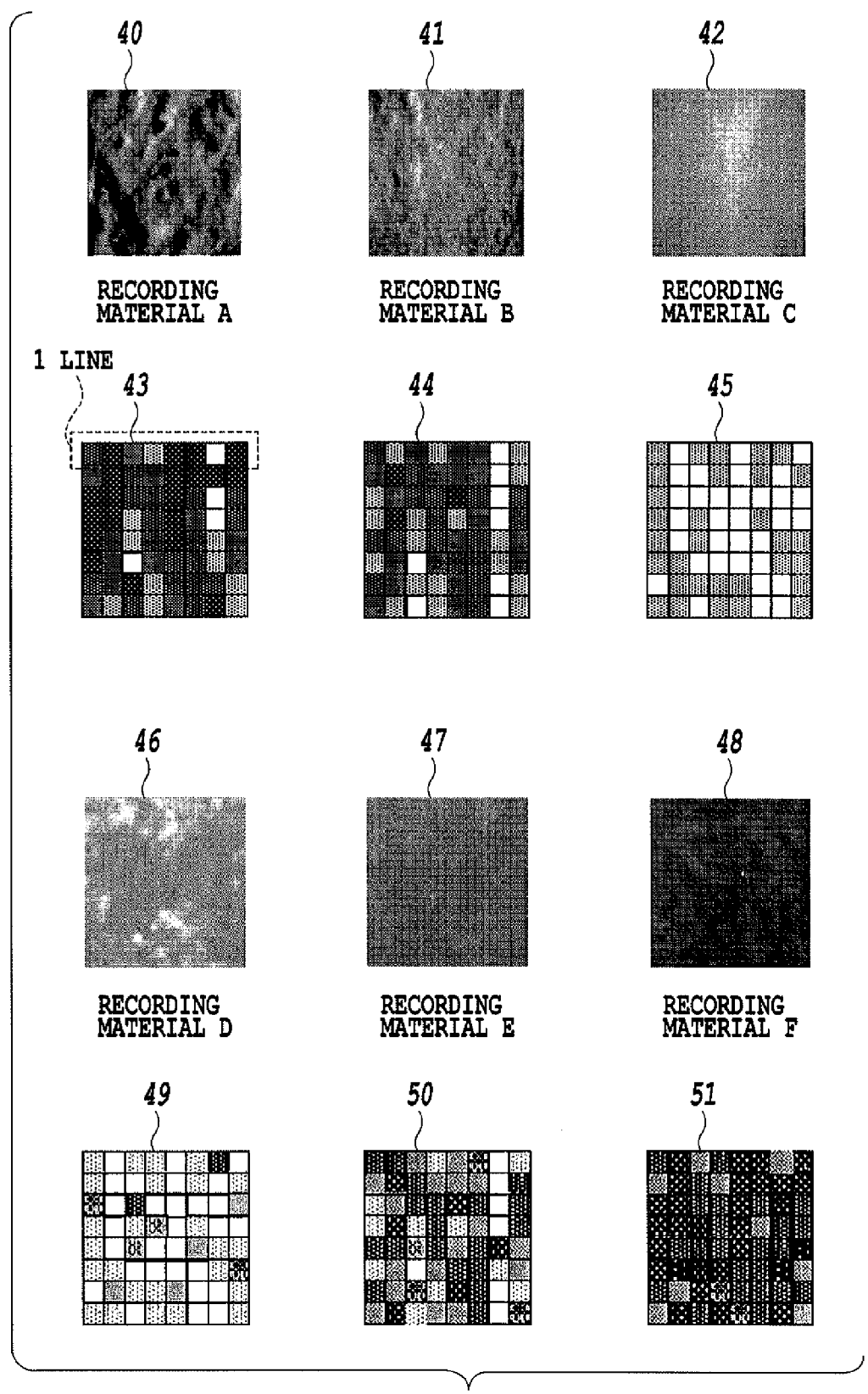
FIG. 6 shows surface images of recording materials with their corresponding digitized images scanned by the CMOS sensor 211.

When recording materials A, B, and C, each being of a different recording material type, are irradiated by the LED 301 upon their respective front-side surfaces, and images of the respective front-side surfaces thereof are picked up by the CMOS sensor 211, the images obtained are like the images 40, 41, and 42 shown in FIG. 6, for example. FIG. 6 shows enlarged images. Recording material A, the surface paper fibers thereof being comparatively coarse, is classified as rough paper. Recording material B is classified as plain paper for typical use (i.e., the surface is less coarse than the rough paper, or in other words paper of a higher smoothness than rough paper). Recording material C, the paper fibers thereof being substantially compressed, is glossy paper (paper of a higher smoothness than plain paper). Images 40, 41, and 42 are images of recording material A, B, and C, respectively. As is apparent from these images, recording material types differ in particular according to the state of their fibers at the surfaces thereof, and for that reason surface images of recording material types also differ.

According to the conventional method, discrimination of recording material type based on the state of fibers at the recording material surface is conducted according to the following process, as described above. First, surface images of various recording materials are picked up. For each surface image, the density value of the pixel of maximum density, Dmax, and the density value of the pixel of minimum density, Dmin, are detected. Subsequently, for each piece of recording material, a peak-to-peak value is calculated as the result of Dmax−Dmin. Subsequently, the recording material whose peak-to-peak value is large is determined to be rough paper, the recording material whose peak-to-peak value is small is determined to be glossy paper, and the recording material whose peak-to-peak value is intermediate between the former two is determined to be plain paper. In this way, based on the pixel density of the picked-up recording material surface images, the recording material quality (smoothness), or in other words the recording material type, is determined.

Since in the conventional method shading correction has to be performed before actually obtaining an image usable for recording material type discrimination, recording material type detection and processing takes a longer amount of time, and the printing speed slows.

Consequently, the present embodiment proposes a recording material discrimination method that is unaffected by light unevenness even when shading correction is not performed, and furthermore is capable of controlling the lowering of its detection accuracy. Implementing the method of the present embodiment results in both prevention of the lowering of printing speed and the realization of a high-speed image formation apparatus.

A detection method that does not perform shading correction will now be concretely described.

Figure 7:
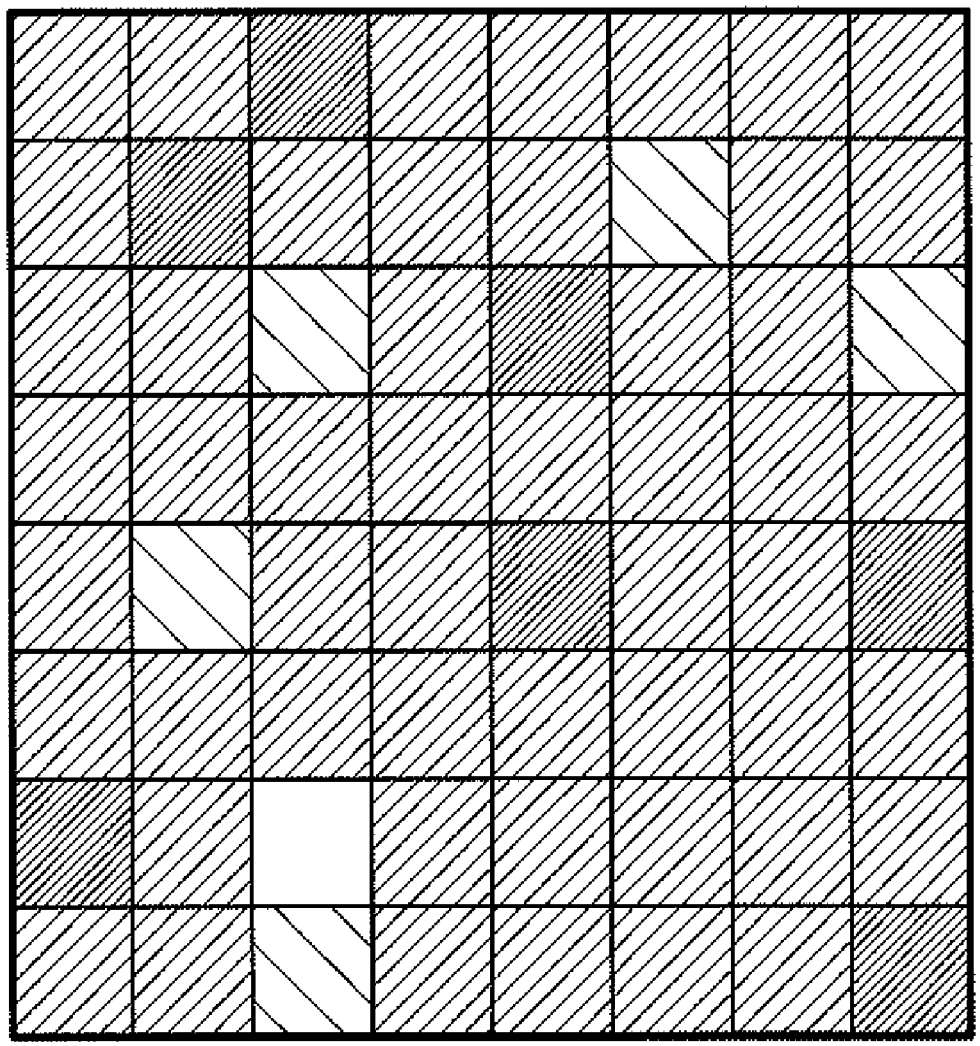
FIG. 7 is a pattern view of an example 8×8 pixel surface image of the recording material 304 as scanned by the CMOS area sensor 801.
Figure 8:
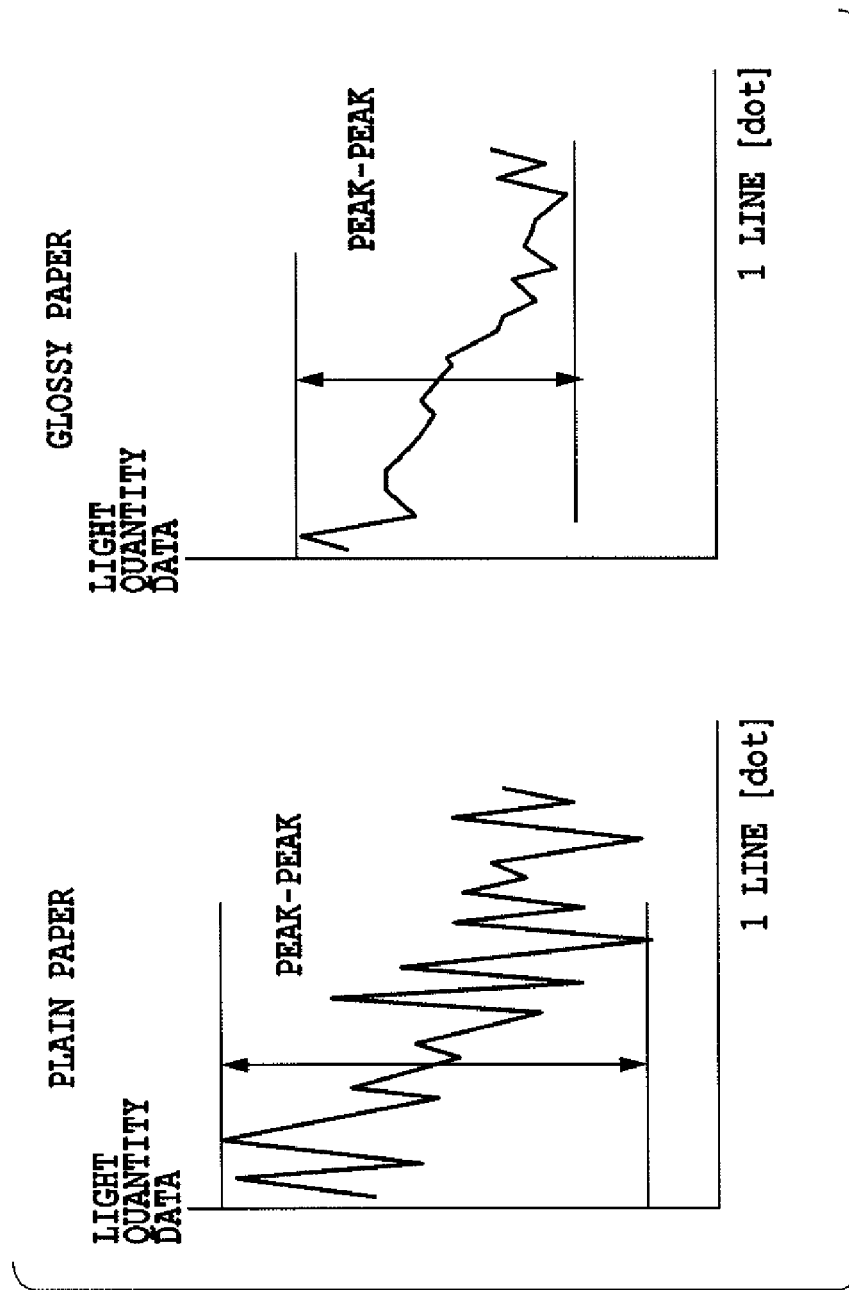
FIG. 8 shows graphs illustrating the peak-to-peak values for plain paper and glossy paper.
Figure 9:
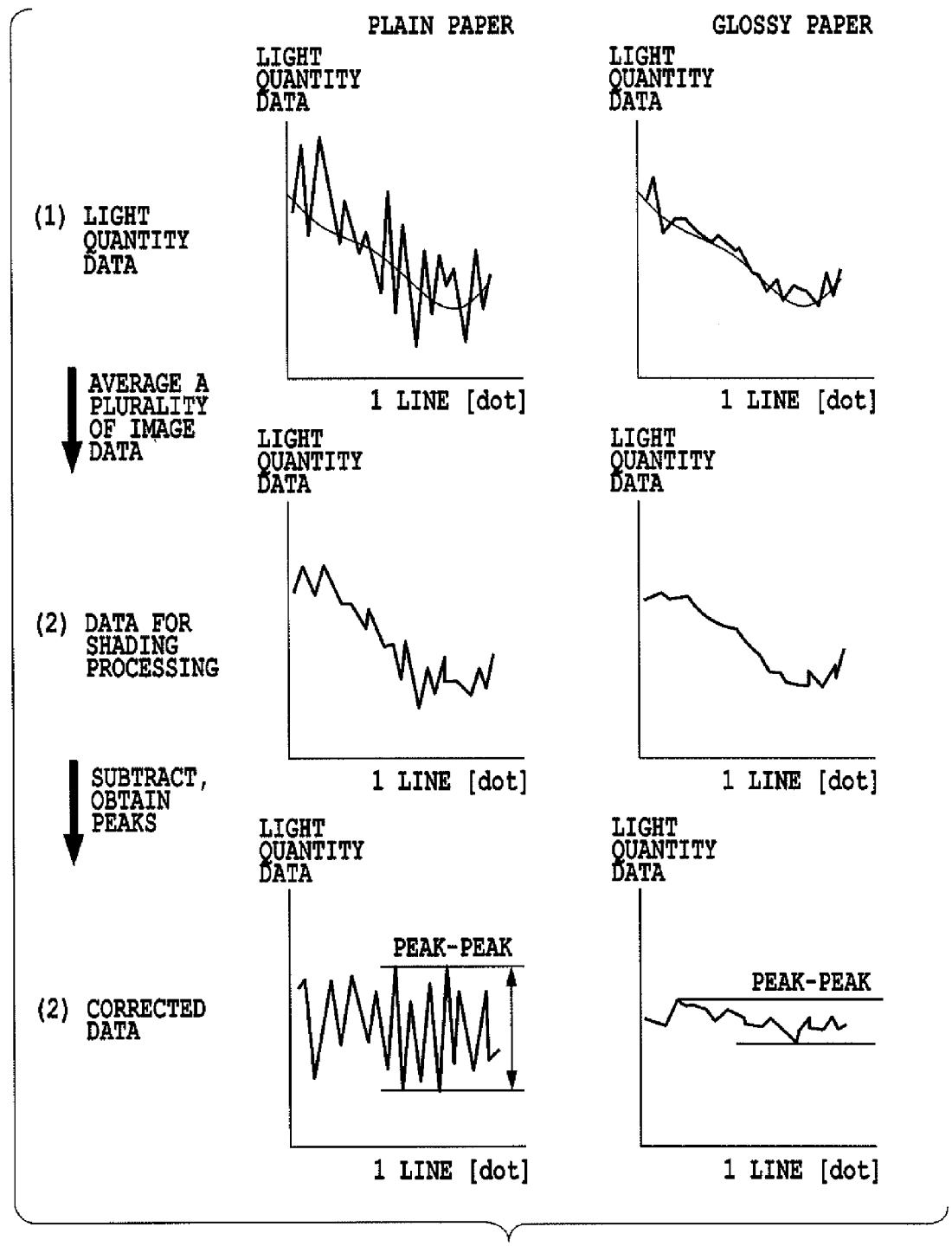
FIG. 9 describes shading correction.

FIG. 7 is an enlarged pattern view of a surface image of the recording material 304 scanned by the 8×8 pixel CMOS area sensor 801. Based on image data constituted by 8×8=64 pixels such as this, the surface smoothness of a piece of recording material is discriminated as a result of executing the processing hereinafter described.

Figure 10:
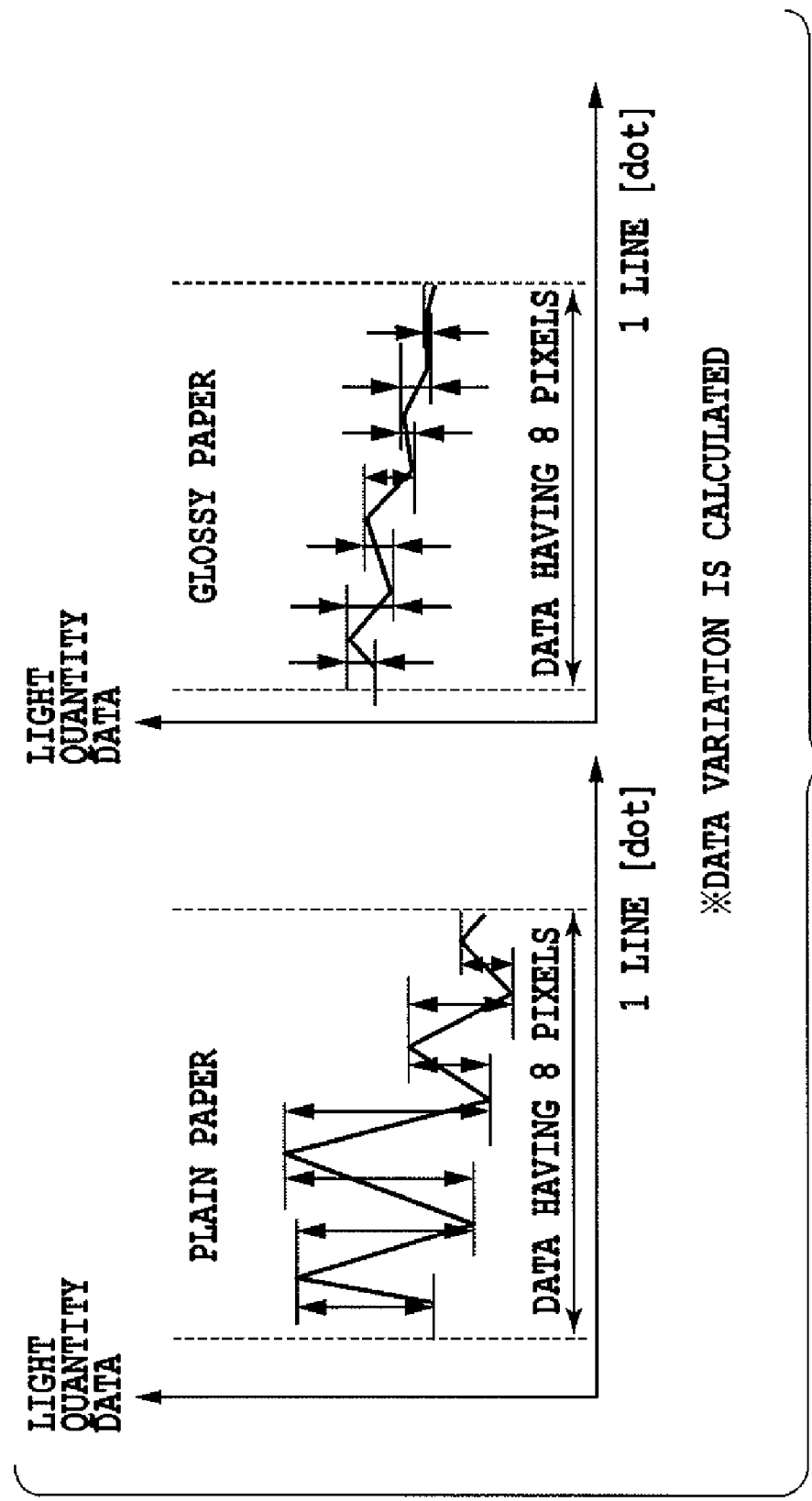
FIG. 10 shows graphs illustrating the differences in light quantity variation between plain and glossy paper.

The graphs in FIG. 10 represent data taken from one output line of the image data output from the CMOS area sensor 801. The detection data obtained from the surfaces of plain paper and glossy paper exhibits both a large overall slope variation due to a light unevenness, and also small per-pixel density (=light quantity) vertical variations. In conventional discrimination procedures using the above-described peak-to-peak values, the overall slope due to light unevenness has a large affect on the resulting data. The present embodiment, in order to reduce the affect of light unevenness, integrates the total amount of per-pixel vertical variations. In other words, the difference in density value between every pixel is integrated. By implementing this procedure, even if there exists an overall slope variation in the data due to light unevenness, the integration of the per-pixel differences in density value represents a considerably larger value than this light unevenness. Consequently, the relative influence of the light unevenness is reduced. The peaks of the line graph in FIG. 10 show the density values (=light quantity data values) for each pixel.

Figure 14:
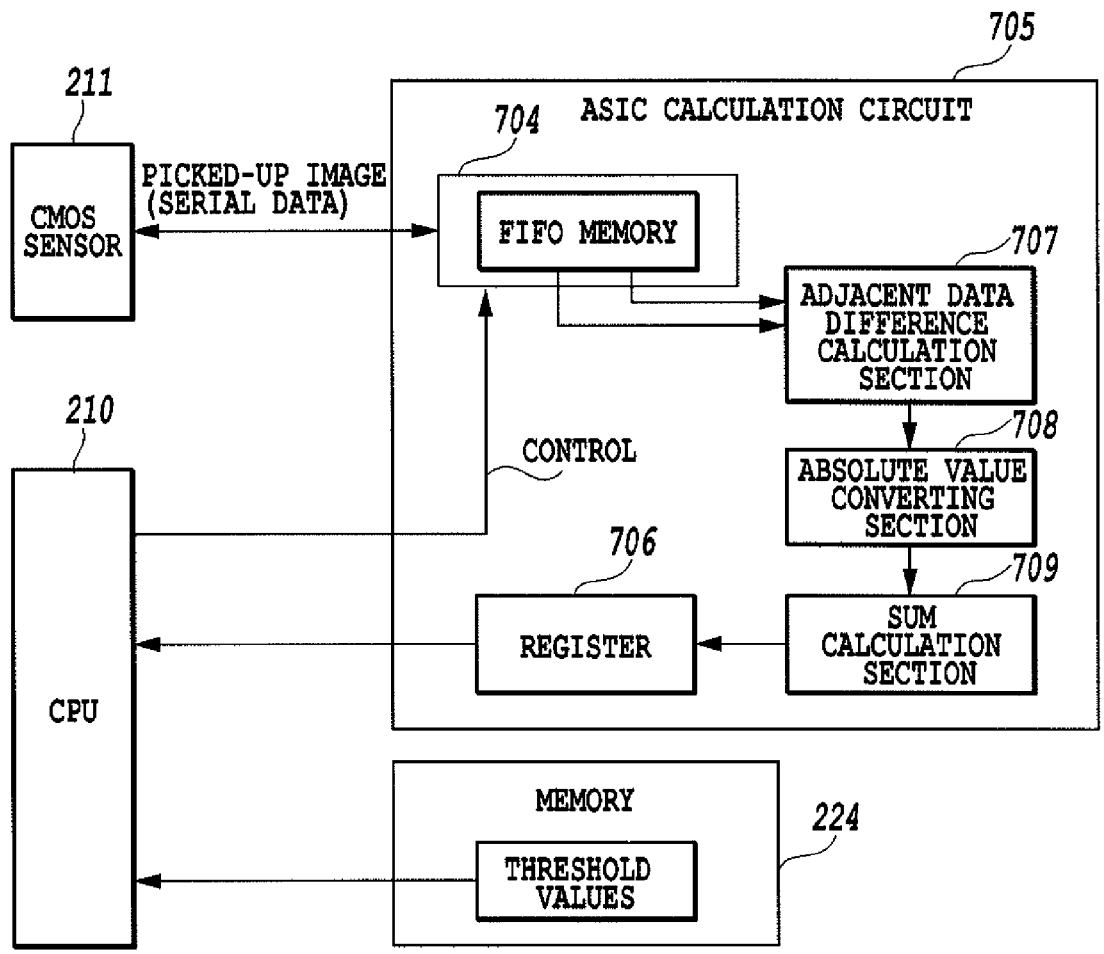
FIG. 14 is a block diagram showing the configuration of a first embodiment of the present invention.

The integration processing of the per-pixel differences in density value in the present embodiment will now be described with reference to FIG. 14. The fundamental control configuration using the CMOS sensor 211 is the same as that described above with reference to FIG. 3. The picked-up image data scanned by the CMOS sensor 211 is stored in a FIFO memory 704 inside a calculation circuit 705 of the ASIC 223. Subsequently, difference calculation component 707 calculates differences in density value of adjacent pixel data in the picked-up image. The difference values are then converted to absolute values by an absolute value conversion 708, and integrated at an integrating calculation component 709. The resulting integration is stored in a register 706. Once the predetermined image picking-up has completed, the CPU 210 refers to the register 706. Meanwhile, predetermined discrimination threshold values are stored for each recording material type in the memory 224. The CPU 210 discriminates recording material by comparing these discrimination threshold values with the detected results. These threshold values may be represented as a value $\alpha$ for discrimination whether a piece of recording material is plain paper or rough paper, and as a value $\beta$ for discriminating whether a piece of recording material is plain paper or glossy paper. The relationship between $\alpha$ and $\beta$ is such that $\alpha > \beta$.

Figure 11:
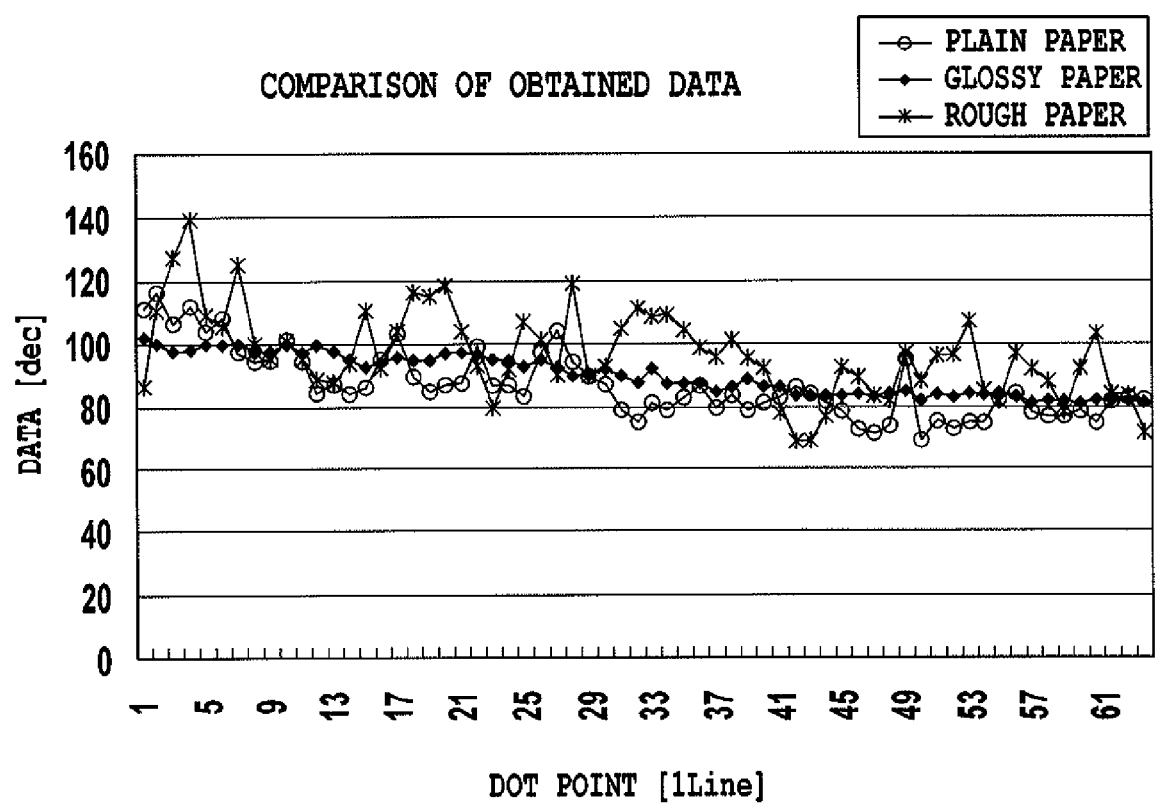
FIG. 11 is a graph of the measured data across one line on a paper sheet for plain, glossy, and rough paper.

The graph in FIG. 11 represents single lines of image data picked-up by CMOS sensor having a 64×64 pixel plain paper, glossy paper, and rough paper recording materials, respectively. The data consists of A/D conversion values from an analog voltage signal that varies according to light quantity.

By comparing these sets of single-line data, it is apparent that the data from the rough paper exhibits the largest amount of vertical variation, plain paper data exhibits the next largest amount of vertical variation, and glossy paper data exhibits the least amount of vertical variation of the three recording material types. Based on the results obtained by the above-described integration processing at the integration calculation component, being a parameter expressing the amount of variation in these sets of data, types of recording material are discriminated.

In the present examples, 8×8 and 64×64 pixel data are presented, but accuracy may be improved more by increasing the number of pixels at the CMOS sensor and increasing the size of the picked-up image region, thereby increasing the amount of data obtained. The number of pixels in the CMOS sensor may be appropriately selected from the amount of obtained data, the data processing capability and a point of view of cost.

Figure 12:
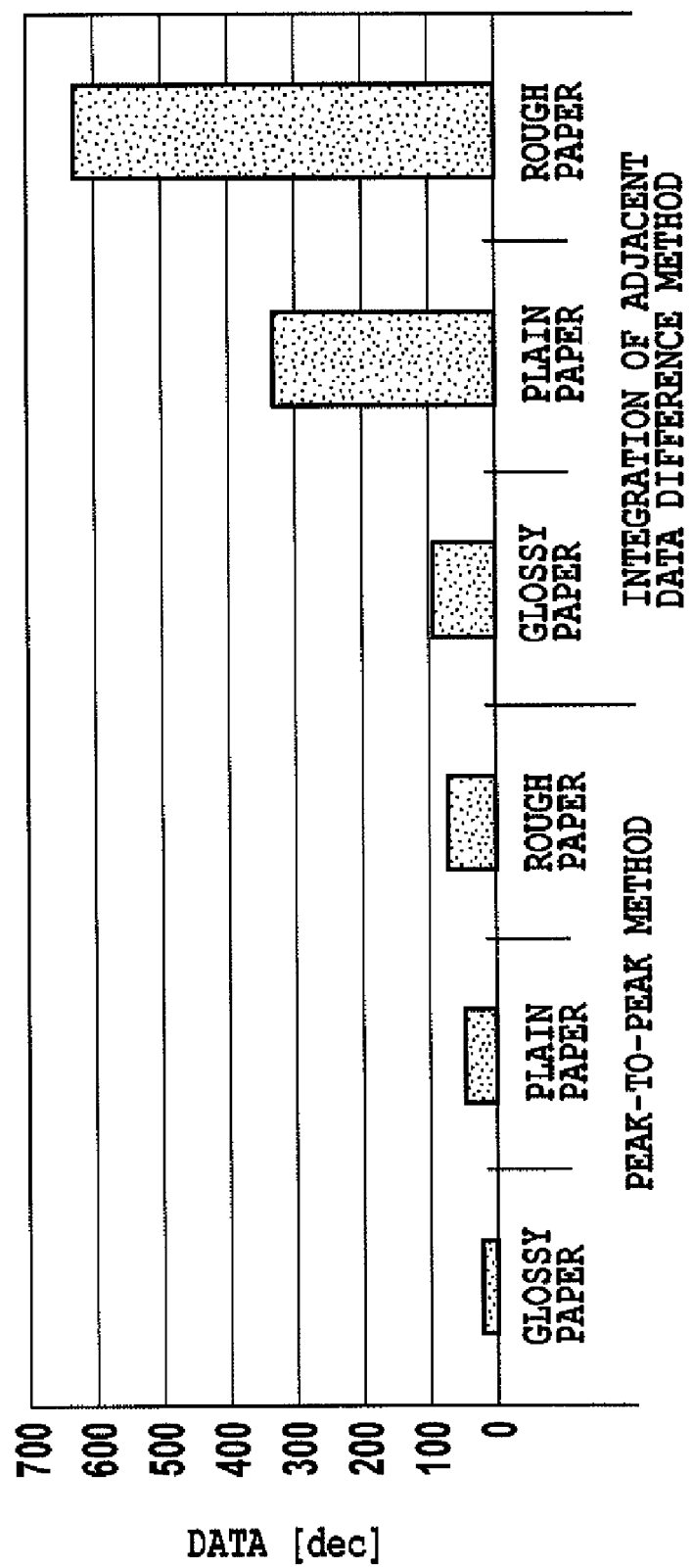
FIG. 12 is a graph comparing the calculated results using the conventional method and those in accordance with an embodiment of the present invention.

FIG. 12 is a graph comparing the discrimination process in accordance with the peak-to-peak values with conventional data shown in FIG. 11, the process in accordance with the difference data obtained by the integration processing in the present invention. The peak-to-peak values for the three recording material types (glossy paper, plain paper, rough paper) have small absolute values all in proximity to one another. As a result, from this data it is difficult to discriminate the types of recording material represented thereby. On the other hand, in the case where the difference data has been integrated, the amount of variations integrated due to per-pixel unevenness results in large absolute values for each of the three recording material types. As a result, from this data it is easy to discriminate the differences in the types of recording material represented thereby. Since these large absolute values extend the dynamic range of the measured data, this latter process is also highly useful for the improvement of the accuracy.

Figure 13:
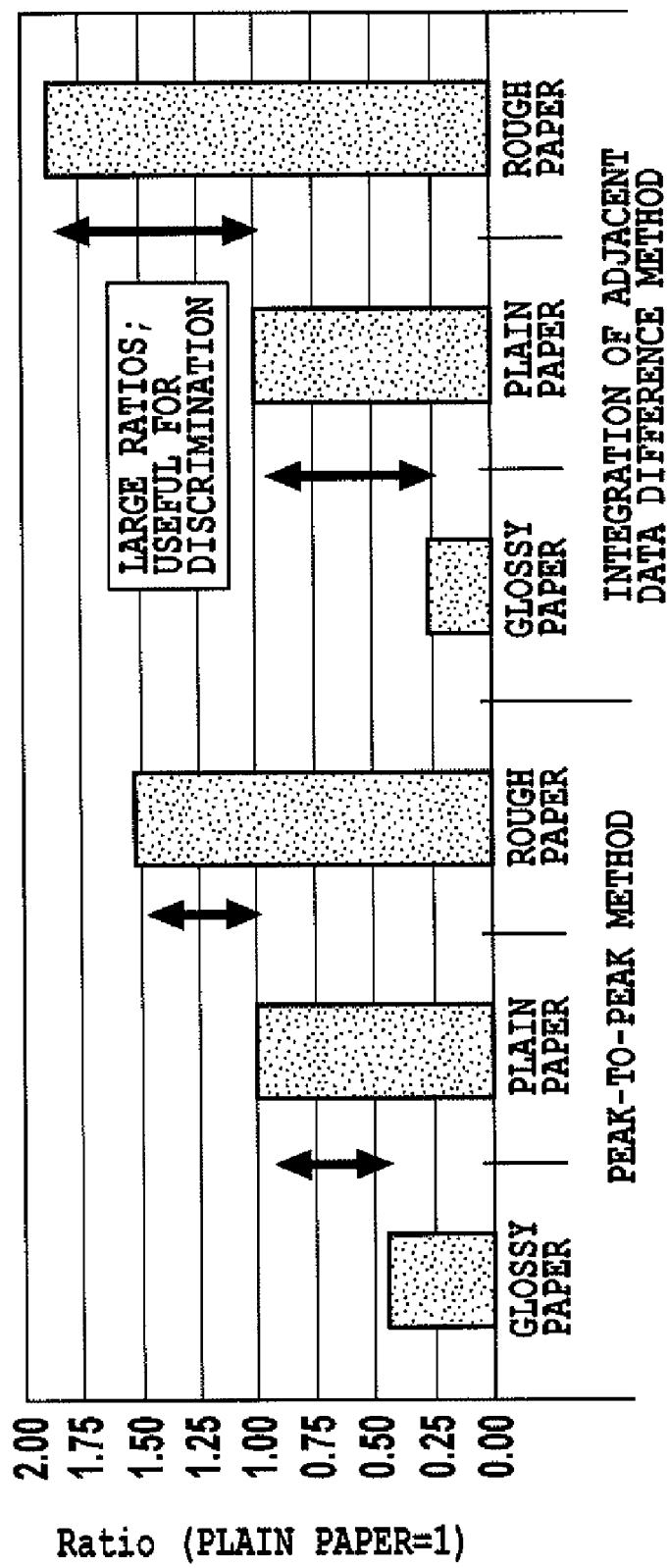
FIG. 13 is a graph comparing the calculated results using the conventional method and those in accordance with an embodiment of the present invention.

FIG. 13 is a graph comparing the discrimination process based on peak-to-peak values and the discrimination process based on the difference data obtained by the integration processing, but wherein the graph has been performed the normalization by setting the values for plain paper equal to 1. As a result, it is apparent that the process with the difference data obtained by the integration processing results in larger relative differences among the data, and therefore is more useful for discrimination performance. Numerical values are shown in Table 1 below.

TABLE 1

| Calculation Process | | Detection Results (as ratios of normal = 1) | | |
| --- | --- | --- | --- | --- |
| | | Glossy | Plain | Rough |
| Conventional Process | Peak-to-peak value | 0.45 | 1.00 | 1.51 |
| First Embodiment | Integration of adjacent pixel data difference | 0.26 | 1.00 | 1.87 |

As is apparent from the above, instead of the peak-to-peak method, which is prone to undergo influence from light quantity unevenness from an LED, the first embodiment method whereby difference data is integrated is more preferable. In other words, the integration of a plurality of per-pixel difference data results in larger values than the peak-to-peak values (the difference between the maximum and minimum density values). Therefore, if the comparable amount of light quantity unevenness data is included in both sets of values, the difference data is more accurate because the difference data, being larger, is less affected by the light quantity unevenness data.

In the present embodiment, the details of the processing for a single line of image data was described, but values for a plurality of lines from the image data may also be integrated and used according to the same procedure, and results obtained by averaging the integrated values corresponding to single lines for a plurality of lines may be used.

In addition, in the accompanying drawings, single lines in the horizontal direction of the image data were processed, but the above-described processing is not limited to such, and data from single columns in the vertical direction of the image data may also be processed.

Furthermore, after discriminating the recording material type as plain paper, rough paper, or glossy paper, control of image formation requirements in the electrophotographic process may be conducted according to the discrimination results. As described above, image formation requirements such as the voltage during development, the fixing temperature, and the transport speed may be controlled, and in addition the primary electrification voltage, primary transfer voltage, and secondary transfer voltage may also be controlled.

(Detection Using Transmitted Light)

For each piece of recording material, light is emitted from the LED 302 for transmitted light, diffused by the diffusion plate 305, and subsequently irradiates the backside surface of the recording material. The CMOS sensor 211 then picks up an image of surface of the recording material. In this manner, image 46, 47, and 48 in FIG. 6 are examples of the images obtained. The images shown in FIG. 6 are enlarged images.

Image 46 is an image of recording material D, a thin paper type. Image 47 is an image of recording material E, a plain paper type. Image 48 is an image of recording material F, a thick paper type. As is apparent from these images, the state of the fibers at the recording material surface in particular, and the fiber density or state of compression differs depending on the recording material type, and for that reason images obtained thereof also differ.

An image obtained from light transmitting through the recording material 304 is scanned by the 8×8 pixel CMOS area sensor 801. The images obtained by digitally processing images 46, 47, and 48 result in output like the images 49, 50, and 51 shown in FIG. 6.

Typically, a transmitted light quantity is derived by totaling or averaging the light quantity incident upon the entire sensing area of the CMOS area sensor 801, or alternatively upon the pixels within a predetermined region of the image. The basis weight of a recording material and the transmitted light are related: for recording materials with heavier basis weights, such as thick paper, the transmitted light quantity is weaker, while for recording materials with lighter basis weights, such as thin paper, the transmitted light quantity is stronger. Consequently, the relative thickness of a recording material can be discriminated based on the transmitted light quantity.

A method for discriminating the following seven recording material types will now be described.

(1) Thin paper (basis weight: $\leqq 64$ g/m$^2$)
(2) Plain paper (basis weight: 65-105 g/m$^2$)
(3) Thick paper 1 (basis weight: 106-135 g/m$^2$)
(4) Thick paper 2 (basis weight: $\geqq 136$ g/m$^2$)
(5) Glossy paper
(6) Glossy film
(7) OHT First of all, among the above seven recording material types, OHTs are transparent and thus the light transmission ratio thereof is high. Consequently, when detecting the surface properties of the above recording material types, a very high result will be obtained for the glossiness of OHT sheets. As a result, the above seven recording material types are easily subdivided into OHTs and a first group including all types except OHT. In other words, the first group includes thin paper, plain paper, thick paper 1, thick paper 2, glossy paper, and glossy film.

Next, based on the tone ratio of the images formed by light reflecting off the recording materials, the first group can be further subdivided into glossy paper, glossy film, and a second group. This second group includes thin paper, plain paper, thick paper 1, and thick paper 2.

Furthermore, since in the second group there exists the relationship among transmitted light quantity such that thin paper>plain paper>thick paper 1>thick paper 2, these recording material types can be differentiated based on the respective quantities of transmitted light.

Furthermore, regarding recording material of differing thicknesses, the heat capacity of the recording material increases as its thickness increases. For that reason, either the carrying speed of the thicker recording material through the fixing apparatus may be more slowed such that the amount of heat per unit time transferred to the recording material is increased, or the fixing temperature may be increased. Additionally, when this control is applied to the case wherein the recording material is an OHT, it is effective against the problem that arises when the fixation of the toner fixed to the surface of the recording material are poor, degrading the overall transparency of the OHT. For example, for OHTs or other translucent or transparent recording materials, the fixing temperature conditions may be changed, raising the fixing temperature in order to improve the translucency/transparency of the recording material. Alternatively, the recording material carrying speed may also be changed according to whether or not the recording material type has translucent/transparent properties. Since there are cases where these fixing conditions differ from the above-described conditions for thick recording material for printing control, different configurations may be provided as separate print modes.

The foregoing embodiment in accordance with the present invention discriminates recording material type using the results of both recording material type discrimination based on detection of the surface smoothness thereof, and also recording material type discrimination based on detection of transmitted light. As a result, a large number of recording material types, including thin paper, plain paper, thick paper 1, thick paper 2, glossy paper, glossy film, and OHT can be discriminated.

A second embodiment of the present invention differs from the first embodiment in that the calculations performed by the calculation circuit 705 of the ASIC 223 are different. It is an object of the second embodiment to further improve the accuracy of recording material type discrimination via additional refinements whereby the light quantity unevenness components of the picked-up image data are removed as thoroughly as possible. The second embodiment differs from the first embodiment only in the processing of calculations performed upon the imaged recording material surface. Consequently, summaries of the detection of transmitted light quantity and other operations of the image formation apparatus are omitted from the description.

Figure 15:
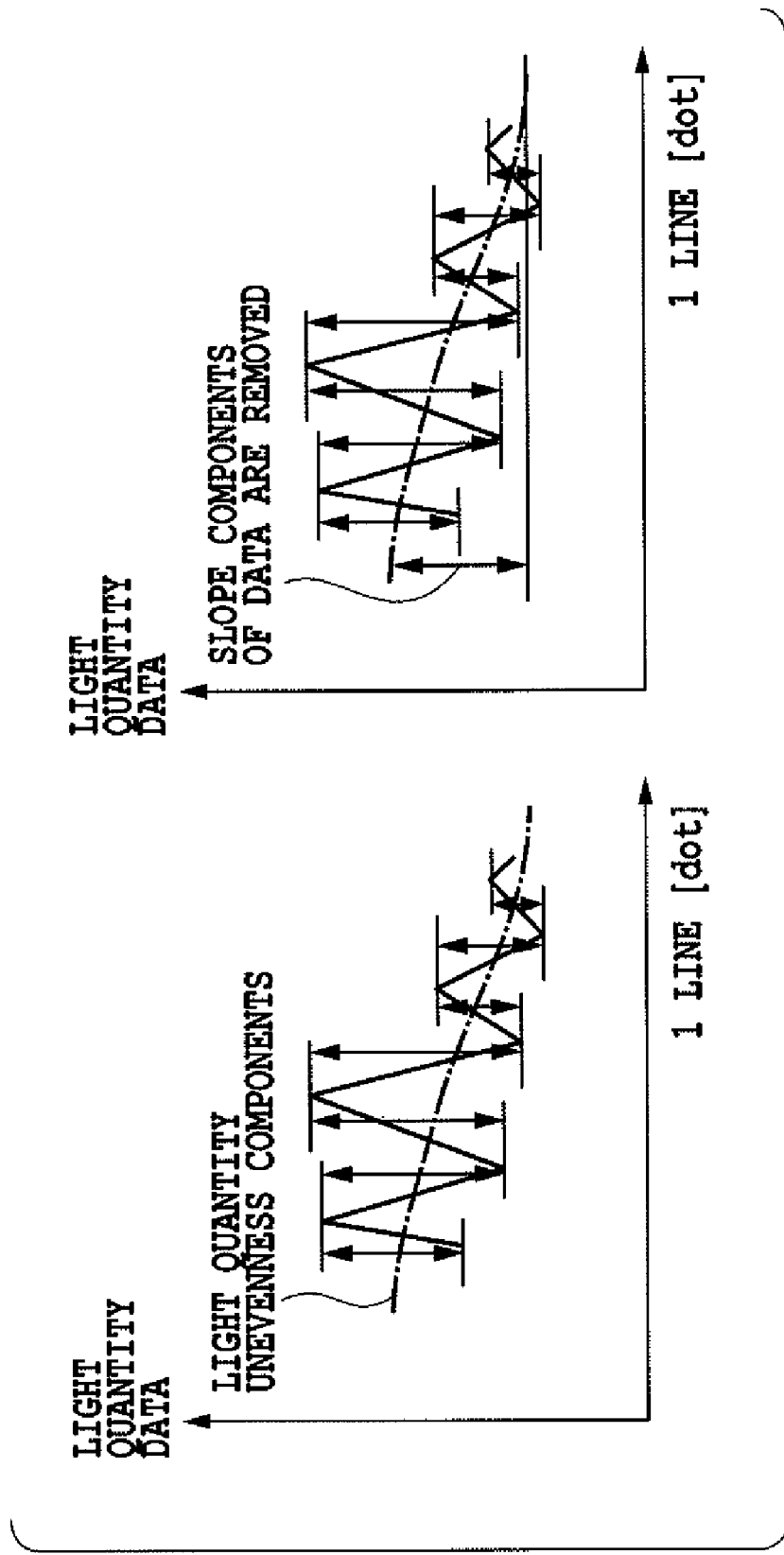
FIG. 15 shows graphs illustrating a second embodiment of the present invention.

FIG. 15 illustrates how the light quantity unevenness components of the picked-up image data are removed. The graphs in FIG. 15 represent data taken from only one line of the two-dimensional output as measured by the CMOS sensor 211. In the left graph of FIG. 15, the data points on the left side of the graph exhibit light quantity values that are larger than the data points on the right side of the graph as a result of light quantity unevenness components within the image data. As shown in the right graph, part of the processing technique in accordance with the second embodiment includes evaluating the light quantity slope across a single line of the data, focusing on discrepancies in the general level of light quantity between left-hand pixels and right-hand pixels are evaluated for. By calculating the moving average of the data across single lines, the overall slope of the data is derived, and thereby the values of the light quantity components of the data are extracted, as shown in the left graph of FIG. 15. In the present embodiment, moving average is calculated for every four pixels, and the value of (maximum value−minimum value) for the slope components of the data after moving average processing in a single line is taken as the slope component of that single line due to light quantity unevenness. The extracted values for the light quantity unevenness components are then subtracted from the integrated values of per-pixel light quantity variations in the image data, the integrated values being those described in the first embodiment.

Figure 16:
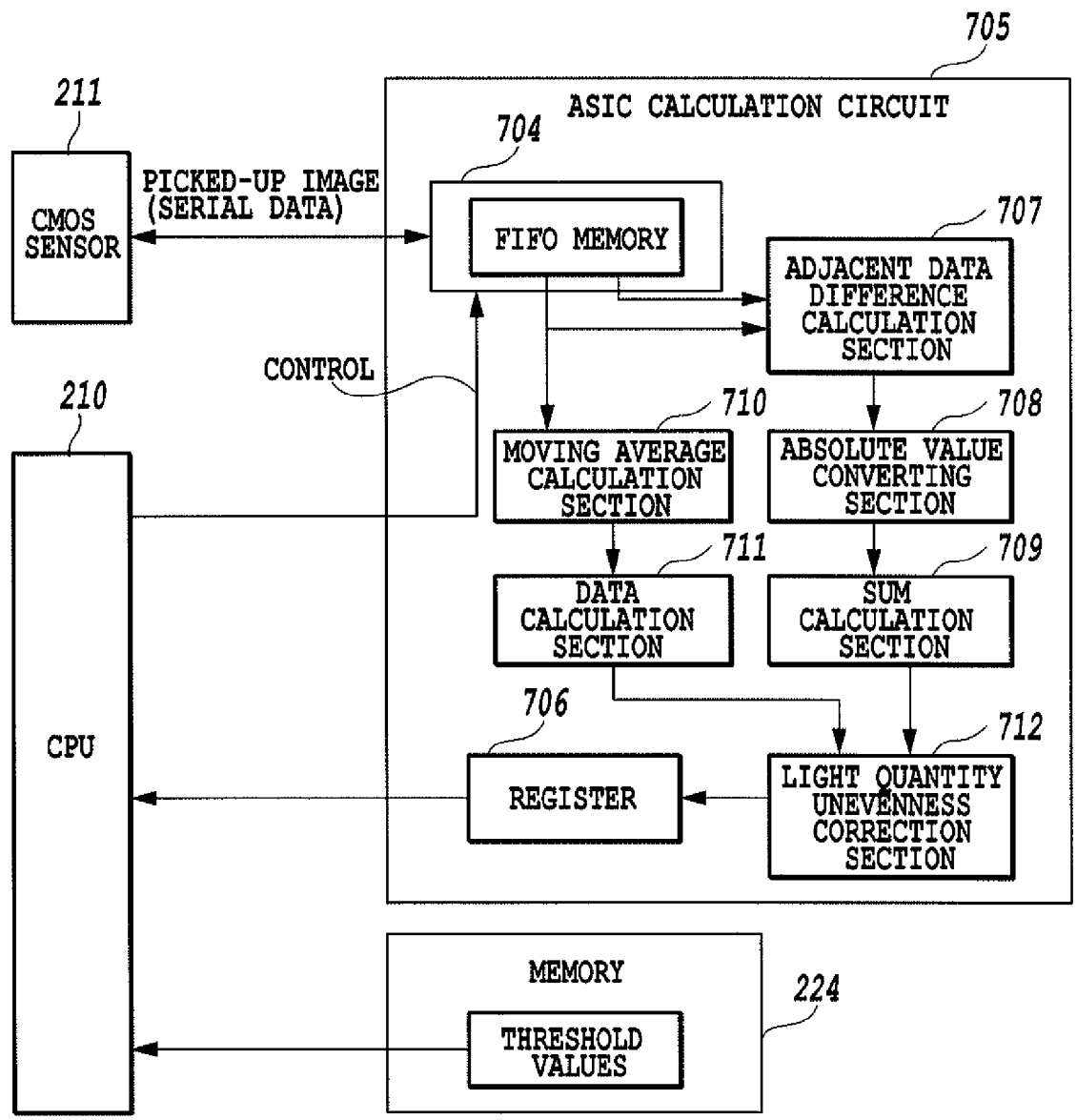
FIG. 16 is a block diagram showing the configuration of a second embodiment of the present invention.

The integration processing of the per-pixel light quantity variations in accordance with the present embodiment will now be described with reference to FIG. 16. The fundamental control configuration of the CMOS sensor 211 is the same as that described above with reference to FIG. 3. The picked-up image data scanned by the CMOS sensor 211 is stored in a FIFO memory 704 inside a calculation circuit 705 of the ASIC 223. Subsequently, a difference calculation component 707 calculates the density differences between pixels in the picked-up image data. The difference values are then converted to absolute values by an absolute value conversion component 708, and integrated at an integrating calculation component 709. Meanwhile, the picked-up image data is sent to a moving average calculation component 710, where moving average data is generated for every pixel on a single line of the image. The output results of the moving average calculation component 710 are then used by the calculation component 711 to calculate the slope for that line of data. The difference between the calculated results for the slope and the data variation integrated value evaluated at the integrating calculation component 709 (integrated value−slope) is then calculated at the light quantity unevenness correcting component 712. Finally, these difference values are stored in the register 706 as the recording material type detection results. In the present embodiment the degree of slope in the data is calculated by taking (maximum value−minimum value) for simplicity, but data variation may also be approximated using the least square method.

Once the pre-determined imaging process has completed, the CPU 210 refers to the detection results in the register 706. Meanwhile, pre-determined identification threshold values are stored for each recording material type in the memory 224. The CPU 210 discriminates the recording material by comparing these discrimination threshold values with the detected results from the obtained image.

Table 2 shows the detection results based on only integrating adjacent pixel difference data in accordance with the first embodiment, and the detection results based on the calculation method in accordance with the second embodiment. The calculated values have been normalized by setting the values for plain paper equal to 1.0, the same as that described for FIG. 11. When compared to their respective values for plain paper, the calculated results in accordance with the second embodiment exhibit smaller values for glossy paper and larger values for rough paper.

TABLE 2

| Calculation Process | | Detection Results (as ratios of plain = 1) | | |
|---|---|---|---|---|
| | | Glossy | Plain | Rough |
| First Embodiment | Integration of adjacent pixel data difference only | 0.26 | 1.00 | 1.87 |
| Second Embodiment | Integration of adjacent pixel data differences, with moving average quantity slope subtracted | 0.23 | 1.00 | 1.95 |

By implementing the above-described calculation method, the effects of light quantity unevenness can be further reduced compared to that of the process for detecting the surface properties of recording materials as described in accordance with the first embodiment. As a result, the recording material type detection system proposed in accordance with the second embodiment is even more accurate. In addition, the configuration described in the second embodiment can be easily implemented in the ASIC and other components, and therefore this system can be fabricated at a low cost.

Additionally, the above-described embodiment is capable of conducting desired printing controls according to the discriminated recording material type. Desired printing controls, for example in the case where the recording material is detected to be glossy paper, may include the following: adjusting the recording material carrying speed, temperature, pressure or other parameters during fixing such that developer is appropriately fixed to the recording material; or changing the developer concentration so as to optimize printing on glossy paper. In addition, temperature and other parameters in the fixing apparatus may also be changed in order to improve the fixing capabilities of the developer with respect to recording materials whose surfaces are coarse, i.e., rough paper.

However, it should also be appreciated that parameters such as the developer bias, fixing temperature of the fixing unit, and recording material carrying speed may also be changed according to the results calculated in accordance with the processing technique of the present embodiment without performing discrimination of the recording material type. In this case, the process by which recording material type discrimination is performed can be omitted.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-232471 filed Aug. 29, 2006, which is hereby incorporated by reference herein in its entirety.

What is claimed is:

1. An apparatus for discriminating the type of recording material, comprising:
    a light emission component irradiating a piece of recording material with light;
    a sensor component having a plurality of image pickup elements, the sensor component picking up an image of the recording material surface by receiving light reflecting off the recording material with the image pickup elements;
    a conversion component converting the picked-up image into image data having a plurality of pixels arranged in a predetermined direction; and
    a calculation component calculating differences in density values between a first pixel and a second pixel, which are mutually adjacent, and integrating the calculated differences in density values to provide an integrated value;
    wherein discriminating the type of recording material is performed based on the integrated value of the density values calculated by the calculation component.

2. The apparatus of claim 1, wherein the image data is two-dimensional image data consisting of a plurality of pixels arranged in a primary direction and a plurality of pixels arranged in a secondary direction, and wherein the calculation component discriminates the type of the recording material based on the integrated value obtained from the plurality of pixels in the primary direction.

3. The apparatus of claim 1, wherein discriminating the type of recording material is performed by comparing the integrated value with a threshold value.

4. The apparatus of claim 1, wherein discriminating the type of recording material is performed based on results obtained by executing moving average processing using the density values of a plurality of pixels of the image data to calculate the light quantity unevenness components and subtract the calculated light quantity unevenness components from the integrated value.

5. An apparatus for forming an image, comprising:
    an image formation component forming an image on a piece of recording material;
    an emission component irradiating a sheet of recording material with light;
    a sensor component having a plurality of image pickup elements, the sensor component picking up an image of the recording material surface by receiving light reflecting off the recording material with the image pickup elements;
    a conversion component converting the picked-up image into image data having a plurality of pixels arranged in a predetermined direction; and
    a calculation component calculating differences in density values between a first pixel and a second pixel, which are mutually adjacent, and integrating the calculated differences in the density values to provide an integrated value;
    wherein image formation requirements of the image formation component are set based on the integrated value of the density values calculated by the calculation component.

6. The apparatus of claim 5, wherein the image data is two-dimensional image data consisting of a plurality of pixels arranged in a primary direction and a plurality of pixels arranged in a secondary direction, and wherein the calculations component discriminates the type of the recording material based on the integrated value obtained from the plurality of pixels in the primary direction.

7. The apparatus of claim 5, further comprising:
a discrimination component discriminating the type of the recording material by comparing the integrated value with a threshold value;
wherein image formation requirements are set according to the type of the recording material discriminated by the discrimination component.

8. The apparatus of claim 5, wherein image formation requirements are further set based on results obtained by executing moving average processing using the density values of a plurality of pixels of the image data to calculate the light quantity unevenness components and subtract the calculated light quantity unevenness components from the integrated value.

* * * * *